Oct. 27, 1942.   G. C. JOHNSON ET AL   2,299,753
WELDING JIG
Filed April 19, 1940   4 Sheets-Sheet 1

INVENTORS.
George C. Johnson
Harry S. Boles
BY
ATTORNEYS.

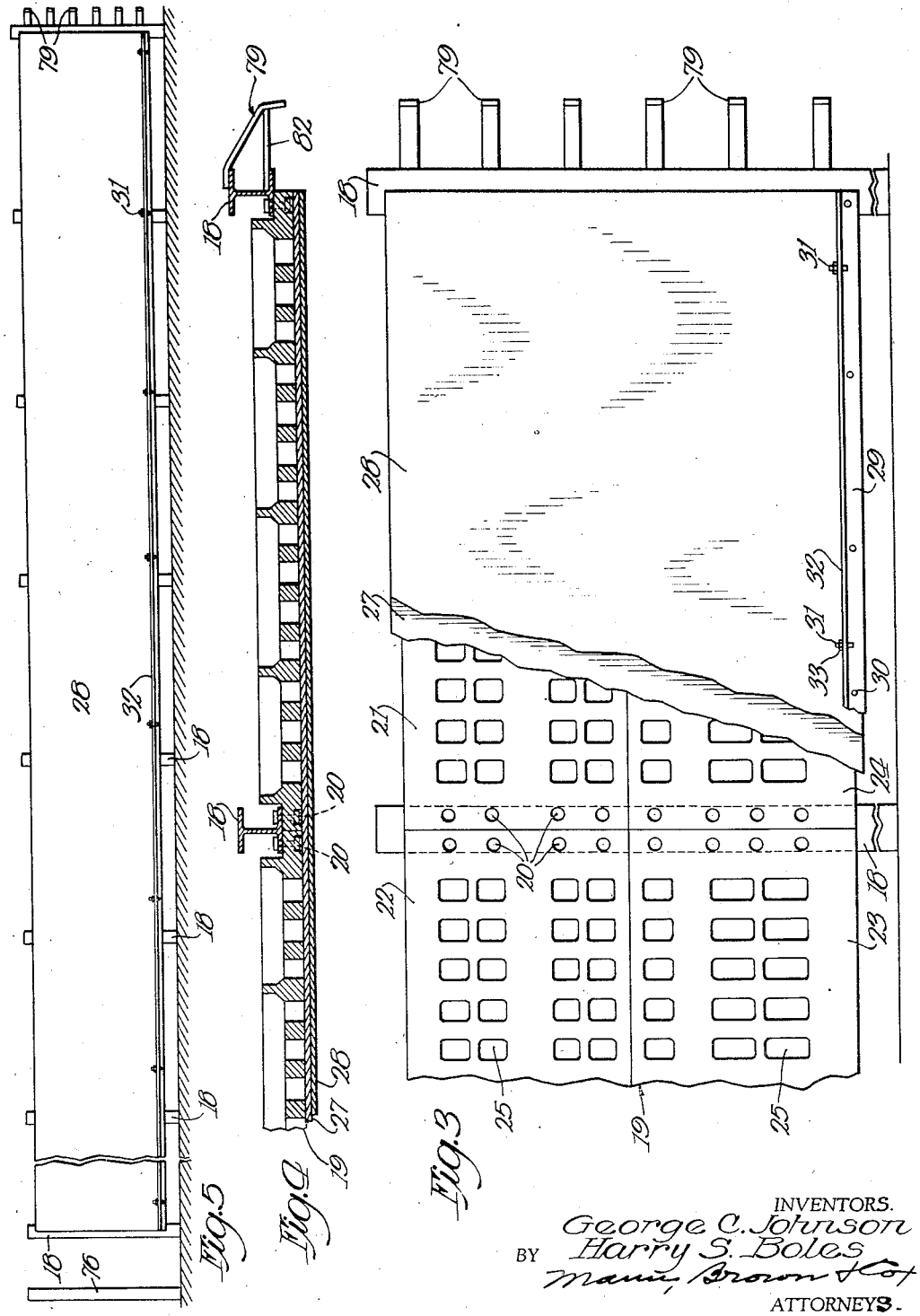

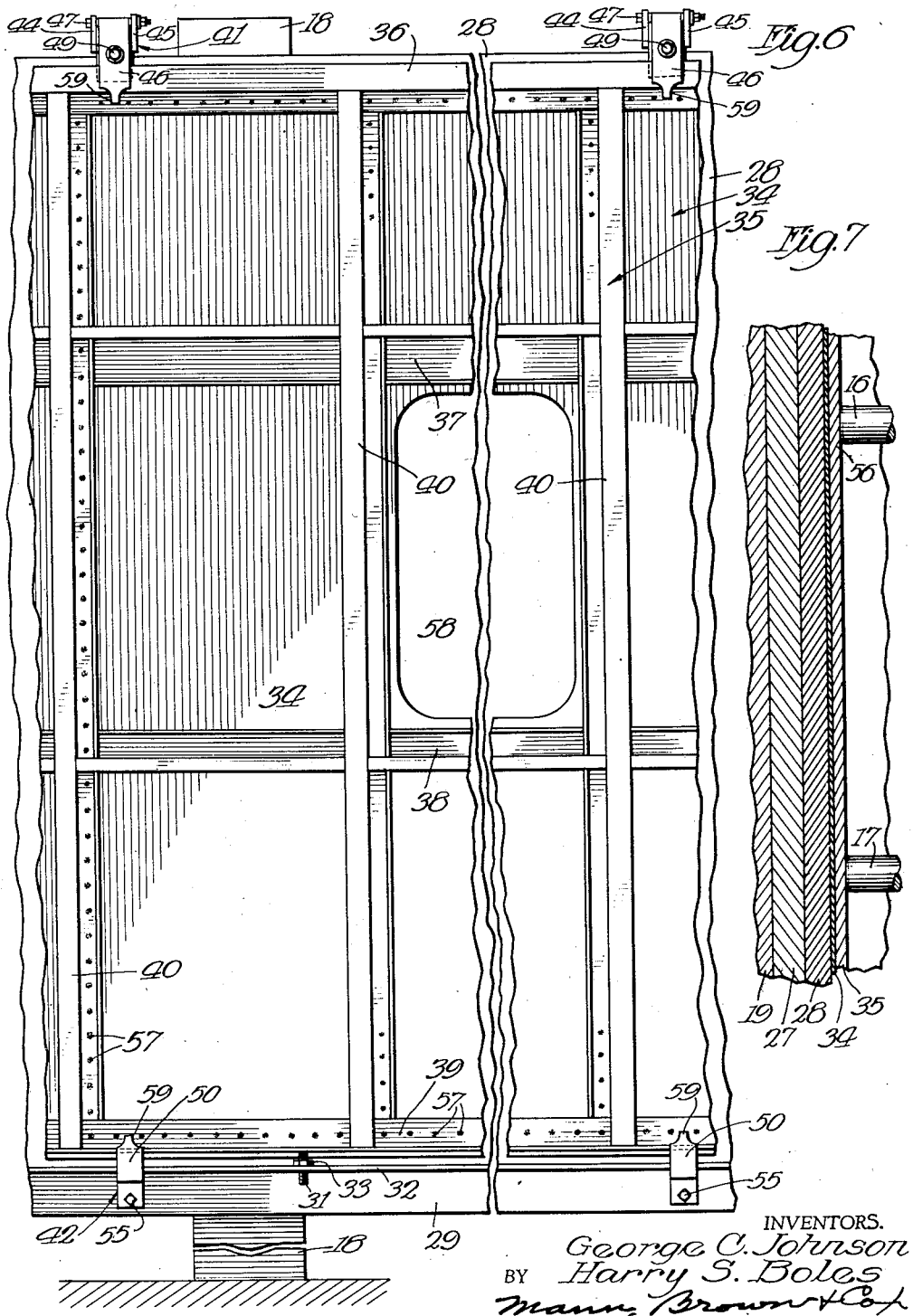

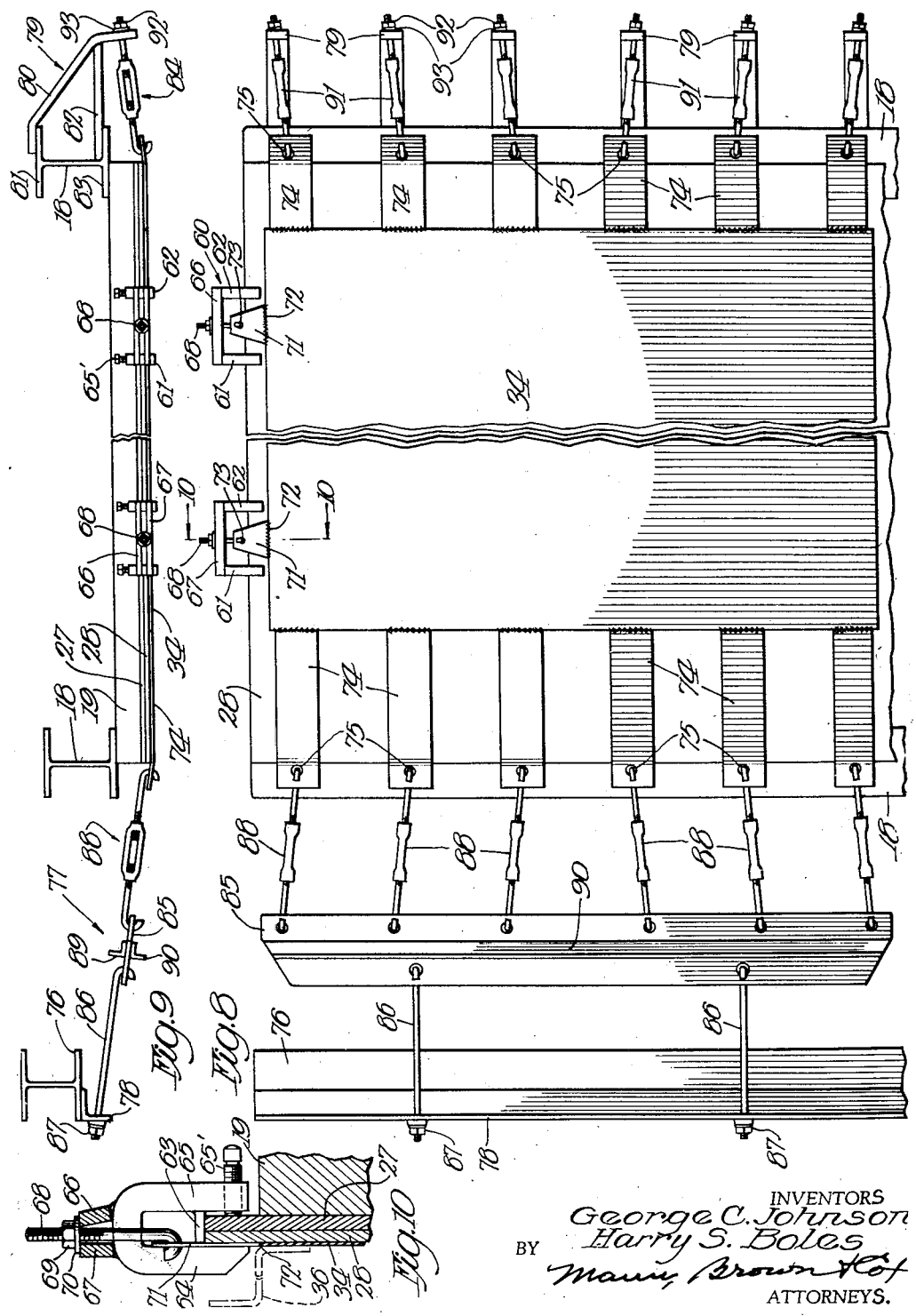

Patented Oct. 27, 1942

2,299,753

UNITED STATES PATENT OFFICE 2,299,753

WELDING JIG

George C. Johnson and Harry S. Boles, Chicago, Ill., assignors to Pullman-Standard Car Manufacturing Company, Chicago, Ill., a corporation of Delaware Application April 19, 1940, Serial No. 330,564

7 Claims. (Cl. 219—17)

The present invention relates to a welding jig for holding the material to be welded. It is adapted for use in the car-building industry and is particularly well suited for holding the side frame and sheathing of a passenger car during the welding together of these two members.

There is no standard passenger car floor plan, so that the spacing of the windows and of the various side posts and other framing members various for practically every car built.

Heretofore, before performing the welding operation when joining the car sheathing to the car side, it has been necessary to make rather extensive adjustments in the jig to make it suitable for holding the particular car side to be welded together. This operation has required considerable time and labor, and thus is expensive and causes much delay in producing cars.

The jig forming the subject matter of the present invention is adapted for universal use in that no changes or adjustments are required to make it suitable for the side of any passenger car.

Smooth outer surfaces on railway cars are demanded by many railroads. The present invention greatly facilitates the production of car sides having smooth outer surfaces. The jig has adjustable means for holding the camber in the side during the welding operation, and only slight adjustments are required to adapt this camber regulating means for use with various car sides.

The above constitute some of the principal objects of the present invention, others of which will become apparent from the drawings and the following description, in which—

Fig. 3 is a fragmentary front elevational view of the jig with a portion of the steel and copper plates broken away to clearly show some of the component parts of the jig;

Fig. 4 is a fragmentary horizontal sectional view of the jig;

Fig. 5 is a front elevational view showing an entire jig suitable for use in the car-building industry;

Fig. 6 is an enlarged fragmentary front elevational view of the jig showing the car side frame and sheathing mounted in place on the jig;

Fig. 7 is an enlarged fragmentary sectional view taken through the jig showing a portion of the backing member, the steel and copper plates making up the front face of the jig and the car side sheathing and framing members in place with the welding electrodes in operative position;

Fig. 8 is a fragmentary side elevational view of the jig showing a longitudinal stretching device forming part of the jig for removing buckles in the sheathing;

Fig. 9 is a top plan view of the jig shown in Fig. 8; and

Fig. 10 is an enlarged vertical sectional view of the clamp taken on line 10—10 of Fig. 8.

Obviously, the present invention has many uses other than the one shown and described. It may be modified and used in many ways other than the one disclosed without departing from the present invention.

Figure 1:
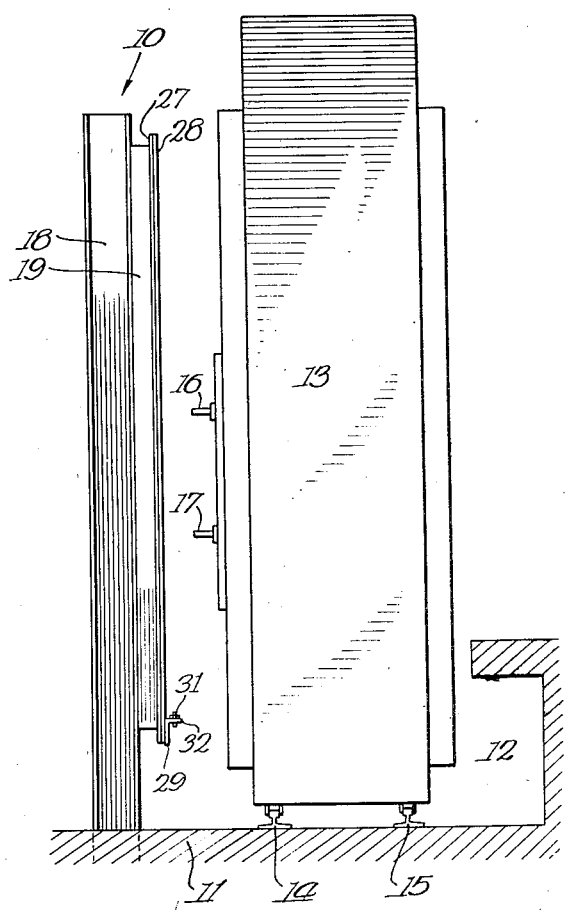
Fig. 1 is a diagrammatic view showing the relationship between the jig and a welding machine used in spot welding together the material supported on the jig.

Referring to Fig. 1, the complete jig 10 is shown supported on a solid floor 11 of concrete or other suitable material. A pit 12 extends along the full length of the jig and a welding machine 13 operates in this pit on rails 14 and 15. Electrodes 16 and 17 extend outwardly from the machine 13 and are adapted to engage the work on the face of the jig 10.

Figure 2:
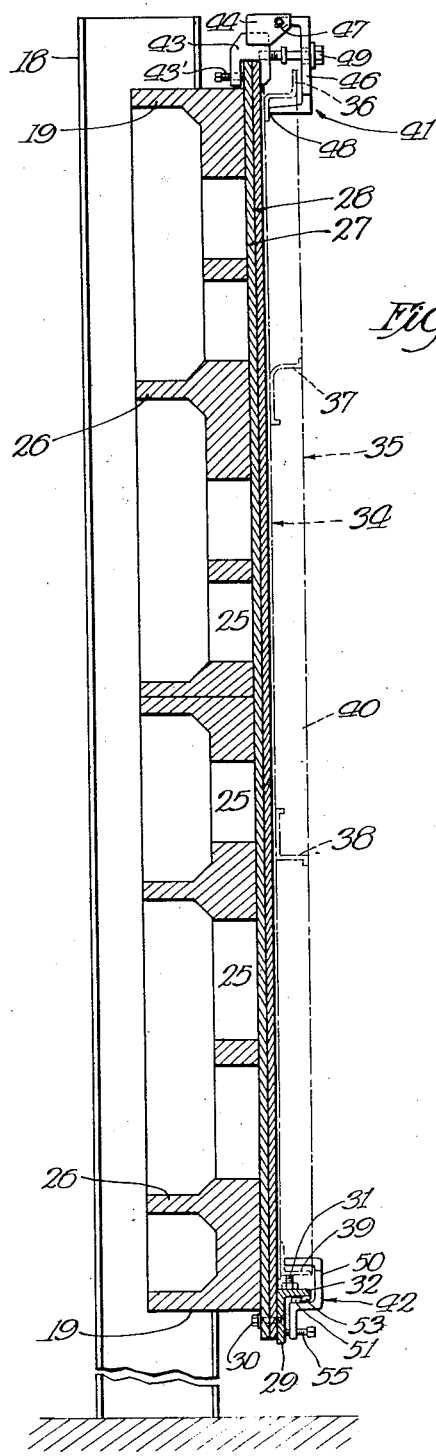
Fig. 2 is a vertical sectional view taken through the jig showing the various parts making up the jig and indicating in broken lines a car side frame and sheathing clamped to the jig.

Referring to Figs. 2, 4 and 5, the jig 10 includes a plurality of posts 18 which may be in the form of beams well grounded in the concrete floor 11. A relatively heavy backing member 19 of cast steel or some such material is bolted as indicated at 20 (Fig. 4) to the post. This backing member may be made up of a plurality of sections, as indicated at 21, 22, 23 and 24 in Fig. 3, and is provided with openings 25 to lighten the member. Suitable reenforcing flanges 26 are provided on the rear face of the backing member to give adequate strength. A plate 27 of steel or some such material is welded or otherwise secured to the backing member and a copper plate 28, coextensive with the steel plate, is permanently secured to the steel plate. This copper plate forms the working surface of the jig upon which is mounted the material to be welded.

Along the bottom edge of the jig is an angle bar 29 bolted to the copper and steel plates as indicated at 30 and a plurality of adjusting studs 31 are spaced along flange 32 of the angle bar 29. These studs are threaded and provided with nuts 33 resting on the upper surface of the flange and serving to permit adjustment of the height of the studs above the flange.

The material to be welded together is mounted on the jig as follows: the car side sheathing 34

(Fig. 2) is mounted with its outside surface against the face of the copper plate 28. Next, the fabricated car side frame, indicated at 35, comprising a side plate 36, window header 37, belt rail 38, side sill 39, and a plurality of side posts, one of which is indicated at 40, is properly placed against the sheathing. The overhead clamps 41 hold the side frame and sheathing at the top against the jig and clamps 42 hold the side frame and sheathing against the jig adjacent to the bottom. The proper camber is built into the side frame when the frame is fabricated; and, upon mounting it on the jig, adjusting studs 31 are drawn up to engage the lower face of the side sill 39 and maintain this camber in the side frame.

Each of the upper clamps 41 comprises a jaw member 43 straddling the steel and copper plates 27 and 28 respectively and secured thereto by a machine screw 43'. Extending from the jaw member 43 are a pair of spaced ears 44 and 45, welded or otherwise secured to the jaw member. Between these ears is a clamping member 46 pinned to the ears by a bolt 47 and extending downwardly to engage the side plate 36 at 48. A tightening screw 49 passes through the clamping member and is threaded into jaw member 43, so that upon the drawing up of the screw 49 the clamping member 46 pivots about the bolt 47 to securely hold the side plate 36 and the sheathing 34 against the copper plate 28.

The bottom clamp 42 comprises a clamping member 50 having an upwardly extending lug 51 with a wedge shaped face. Extending downwardly from the lower face of angle member 29 on the jig is a second lug 53 having a complementary wedging face cooperating with the wedging face of lug 51 to suspend the clamp 50 from the lower face of angle bar 29 when the clamp is hooked in place. An adjusting bolt 55 is threaded through the lower portion of clamping member 50 and engages the outer face of the vertical flange of angle bar 29, so that upon the drawing up of bolt 55 the clamping member 50 rotates about the wedging faces of lugs 51 and 53 in a counterclockwise direction to securely hold the side sill 39 and sheathing 34 against the copper plate 28. In this manner, the entire sheathing for the car and prefabricated car side frame are held together on the jig against copper plate 28 ready for the welding operation to be performed.

Welding machine 13 is next drawn into position for welding and the electrodes 16 and 17 are placed against one of the side framing members, as indicated at 56 in Fig. 7. During the welding operation, electrical current passes from one of the electrodes, say, for example, 16, through the framing member 56, side sheathing 34, to the copper plate 28, through which it is conducted to the other electrode 17 back through the side sheathing 34 and framing member 56. There is some passage of current from electrode 16 directly through the framing member 56 to electrode 17 and likewise between electrodes through the sheathing 34, but because of the fact that the framing members and side sheathing are made of steel, whereas the plate 28 is of copper having very much less resistance than the other two members, the majority of the current takes the path of least resistance through the copper plate.

After each weld is completed, the electrodes are moved along the framing member to complete a plurality of spot welds, indicated at 57 in Fig. 6, and in this manner the car side frame is welded to the sheathing.

The sheathing 34, when mounted on the jig, is for the entire car side and is generally made up of a plurality of small sheets arc-welded together into one integral sheet extending the full length and height of the car side. Window openings 58 (Fig. 6) are cut out of the sheets, preferably before the smaller units are welded together, and the size and location of these window openings depends upon the particular floor plan of the car under construction.

Proper camber may be placed in the side sheathing 34 during the fabrication of the smaller sheets into the integral side sheet, and, when the entire sheathing is mounted on the jig, it is supported from the top and hung so as to eliminate all ripples and buckles in its outer surface. The side frame, generally indicated at 35, is made up of a plurality of horizontal and vertical framing members, as previously described, all of which are welded together, preferably in a separate framing jig, with its proper camber built into the frame during the construction process. The particular size, shape and location of the various framing members will depend upon the floor plan and design of the car under construction.

When the side frame is completed, it is brought to the vertical jig forming the subject matter of the present invention and is mounted against the sheathing 34, as previously described.

It is important to note that no matter how the window openings and various framing members are arranged they are applied immediately to the jig without the requirement of initial adjustments to adapt the jig for the particular car side to be welded.

The copper plate serves as a flush bearing surface upon which the sheathing and side frame are mounted, and also conducts the electrical current passing between welding electrodes. The finished car side is free from welding scars since the electrode pressure is applied to the inner surface of the framing members rather than the surface of the sheathing, and the reaction pressure of the copper plate against the outer surface of the sheathing is spread over a large area. The side is also free from ripples and buckles, because the sheathing is initially suspended from points adjacent to its upper edge in such a manner as to remove any ripples which may have existed prior to the welding of the side frame to the sheathing, and the clamps firmly hold the sheathing in this position.

As shown in Fig. 6, the upper and lower clamps 41 and 42 respectively are tapered at 59, and are placed along the side frame in such a manner that they do not interfere with the spacing of the welding spots.

The posts 18 must be firmly supported in a vertical position and may be set directly into the concrete floor 11.

As shown in Figs. 8–10, inclusive, the side sheathing 34 is held in place on the jig by supporting members 60 mounted at the top of the jig. These supporting members each comprise a pair of inverted U-shaped clamps 61 and 62 having a spacer 63 secured to the legs 64 and 65 of each clamp. When the clamp is in place, legs 64 and 65 straddle the steel and copper plates 27 and 28 with the spacer 63 resting on the top of these plates. Extending across the tops of the inverted U-shaped clamps 61 and 62 are a pair of plates 66 and 67 mounted in an upright position and spaced to provide an opening therebetween to receive a hook 68 (Fig. 10), which passes downwardly between plates 66 and 67 forming the hook below these plates. The top of the hook 68 is threaded to receive a nut 69, and a washer 70 is placed between the nut and the plate members 66 and 67 so that the hook is supported on the tops of these plates, and its height may be adjusted by turning the nut 69. Straps 71 are welded, as indicated at 72 (Fig. 8), or otherwise secured along the top of the side sheathing 34 and hook 68 on each supporting member 60 hooks through an opening 72 in one of the straps 71 for supporting the sheathing. An adjustable screw 65' (Fig. 10) passes through leg 65 of each U-shaped clamp and serves to secure the clamp to the top of the jig.

In some instances, supporting of the side sheathing at the top may be sufficient to remove all wrinkles and ripples in the sheathing; but, in order to facilitate the removal of these imperfections, a stretching device in conjunction with the jig may be employed. Along the opposite vertical edges of the sheathing, a plurality of straps 74 are welded or otherwise secured, and each is provided with a hole 75 adjacent to its outer end.

Some means of supporting the stretching device must be provided, and, for the purpose of illustration, two suitable means are shown. Referring particularly to Fig. 9, at the left side thereof an anchor beam 76 is mounted on the floor or in the ground, and the stretching device generally indicated at 77 is fastened to this anchor beam by means of an angle bar 78. This anchor beam serves as the support for the stretching device. At the right side of the same figure, a second support is shown, which includes a bracket 79 made up of an irregularly shaped plate 80 extending to the rear flange 81 of the end I-beam 18 forming part of the welding jig. A plate member 82 extends from the front flange 83 of the I-beam 18 and is welded to the irregularly shaped member 80 to serve as a compression member in the bracket 79. The stretching mechanism 84 is supported by the bracket 79.

After the side sheathing 34 is mounted on the jig and the nuts 69, varying the heights of hooks 68 on the overhead supports, are properly adjusted to remove most of the ripples in the car side sheathing and to hold the proper camber in the sheathing, the stretching mechanism is attached to the opposite ends of the sheathing. At the left side of the jig shown in Fig. 8, this mechanism comprises the I-beam 76, a floating or equalizing beam 85, a pair of rods 86 hooked to the beam 85 and secured at their opposite ends to the angle member 78 by means of nuts 87 threaded onto the ends of rods 86, and a plurality of turn buckles 88 secured to the floating beam 85 and to the outer ends of straps 74. Reinforcing angles 89 and 90 (Fig. 9) are provided on the opposite sides of the floating beam 85 to stiffen the beam.

On the right-hand side of the jig shown in Fig. 8, the stretching device includes the bracket 79 and turn buckles 91 hooked to the outer ends of straps 74 and carried by the brackets 79. A nut 92 is threaded onto the free end of each turn buckle 91, and a washer 93 is inserted between the nut and the bracket.

When the various turn buckles are hooked into place through the ends of straps 74, they are tightened to distribute the stretching in the desired manner. Because of window openings and other cut-outs in the side sheathing, it is often desirable to adjust the turn buckles so that the stretching is concentrated above and below these openings, so that in the zone of these openings the sheathing is stretched to a much lesser degree. This adjustment is made by the initial setting of the numerous turn buckles 88 and 91 on the two ends of the sheathing. After the stretching mechanism is adjusted to the desired degree, the remainder of the stretching is accomplished by tightening nuts 87 on the ends of rods 86, so that a pulling force is placed on the floating beam 85, which, in turn, applies a pulling force on each of the turn buckles 88, thereby stretching the side sheathing the desired amount.

It is to be noted that the turn buckles 88 and 91 are pitched so that those above the longitudinal center line of the sheathing are inclined upwardly, whereas those below are inclined downwardly. The purpose of inclining these members is to place opposed vertical components in the horizontal stretching forces so as to remove any horizontal ripples which may otherwise be formed.

The stretching device just described is particularly suited for use with the present jig, because the sheathing may be applied to the jig and the stretching operation performed without any thought being given to the locations of the framing members in the side frame to be mounted on the sheathing. The copper plate which forms the conductor for electrical current passing between the welding electrodes is universal in its action, because, no matter where the electrodes may be placed against the framing members, the backing electrode is properly placed so that the welding operation may be performed.

We claim:

1. A welding jig for supporting a vehicle side in a vertical position while welding the vehicle side frame and sheathing together comprising a rigid back plate, means for supporting the back plate firmly in a vertical position, an intermediate plate secured to the face of the back plate, a copper plate mounted one face against the outer face of the intermediate plate, the intermediate and copper plates being substantially coextensive with the back plate, clamping means adjacent to the top and the bottom of the jig for holding the side sheathing and frame in place against the copper plate, and means at the bottom of the jig adjustable to the degree of camber in the side frame and adapted to hold the camber in the side frame while the frame is on the jig.

2. A welding jig for supporting a vehicle side in a vertical position while welding the vehicle side frame and sheathing together comprising a rigid back plate having a substantially plane outer face, means for supporting the back plate firmly in a vertical position, a copper plate substantially coextensive with the back plate mounted with its inner face against the outer flush face of the back plate, an angle member extending lengthwise to the copper plate and secured along the bottom thereof, said angle member having one flange extending outwardly at right angles to the copper plate, a plurality of upwardly extending studs spaced along the length of and being secured to the outwardly extending flange of the angle member, the height of said studs above the flange being adjustable, and means for holding the vehicle side against the copper plate.

3. A welding jig for supporting a vehicle side in a vertical position while welding together the vehicle side frame and sheathing, comprising a rigid back plate, means for supporting the back plate firmly in a vertical position, a copper plate mounted on the back plate and being substantially coextensive therewith, means adjacent to the top of the jig for suspending the side sheathing in a vertical position against the outer face of the copper plate, and means adjacent the sides of the jig to apply tension to the side sheathing, said means being so disposed as to produce both horizontal and vertical force components in the side sheathing, the car side frame being held in position against the exposed face of the sheathing.

4. A welding jig for supporting a vehicle side sheathing and side frame in assembled positions during the welding together of same comprising a rigid metallic plate substantially coextensive with the side sheathing and having relatively high electrical conductivity, means for supporting the plate in a vertical position, means adjacent to the top of the jig to suspend the sheathing on the jig against the plate, said last named means being adjustable so as to regulate the degree of camber in the side sheathing, means adjacent to the bottom of the jig for supporting the vehicle side frame on the jig against the sheathing, said last named means having adjustable means adjustable to conform to the degree of camber in the side frame, and means for holding the vehicle side frame firmly against the sheathing.

5. A welding jig for supporting a vehicle side in a vertical position while welding together the side frame and sheathing comprising a metallic plate having a high degree of electrical conductivity and being substantially coextensive with the side sheathing, means for supporting the plate in a vertical position, supporting means adjacent to the top of the jig for suspending the sheathing on the jig, and stretching means adjacent to the opposite ends of the jig adapted to be attached to the vertical edges of the sheathing and to stretch the sheathing longitudinally thereof, said stretching means being arranged to apply to the sheathing opposed vertical components of forces during the longitudinal stretching of the sheathing.

6. A welding jig for supporting a vehicle side in a vertical position while welding together the side frame and sheathing, comprising a metallic plate having a high degree of electrical conductivity and being coextensive with the side sheathing, securing means adjacent the top and sides of the jig adapted to grip the sheathing, the securing means adjacent the top being independently adjustable as to vertical position and the securing means adjacent the sides also being independently adjustable laterally but disposed at an angle whereby opposed horizontal and vertical force components may be produced in the sheathing, a flange member rigidly attached to the jig adjacent the lower extremity thereof, said flange having a laterally extending leg, a plurality of tapped openings in said leg, and threaded studs adapted to be received by said openings, said openings being spaced outwardly from the face of the jig whereby camber may be maintained in the side frame independently of the position of the sheathing on the jig.

7. A welding jig for supporting a vehicle side sheathing and cambered side frame in assembled positions during the welding together of same comprising a rigid metallic plate substantially coextensive with the side sheathing and having relatively high electrical conductivity, means for supporting the plate, means for holding the sheathing on the jig and against the plate, means for supporting the vehicle side frame on the jig against the sheathing and adapted to hold the camber in the frame, said last named means being adjustable to correspond to the degree of camber in the side frame, and means for holding the side frame against the sheathing.

GEORGE C. JOHNSON.
HARRY S. BOLES.